United States Patent [19]

Park et al.

[11] Patent Number: 4,980,229

[45] Date of Patent: Dec. 25, 1990

[54] ARTICLE SURFACE COATED WITH CURABLE PARTICULATE OR FILAMENTARY MATERIAL

[75] Inventors: George B. Park, Purton; George M. J. Gansbuehler, Liden; John M. Senior, Shaw, all of England

[73] Assignee: Raychem Corporation, Menlo Park, Calif.

[21] Appl. No.: 162,526

[22] Filed: Mar. 1, 1988

[30] Foreign Application Priority Data

Mar. 3, 1987 [GB] United Kingdom ............... 8704941
Sep. 2, 1987 [GB] United Kingdom ............... 8720645

[51] Int. Cl.$^5$ ............................ B32B 5/16; B05D 3/02
[52] U.S. Cl. ...................................... 428/327; 428/206; 428/40; 428/43; 428/413; 428/483; 427/372.2
[58] Field of Search ............... 428/327, 200, 413, 483

[56] References Cited

U.S. PATENT DOCUMENTS

| | | | |
|---|---|---|---|
| 3,960,983 | 6/1976 | Blank | 428/460 |
| 4,032,010 | 6/1977 | Evans | 40/316 X |
| 4,043,960 | 8/1977 | Kress et al. | 428/436 |
| 4,069,186 | 1/1978 | Ramig . | |
| 4,125,675 | 11/1978 | Sekiguchi et al. | 428/521 |
| 4,196,253 | 4/1980 | Spence | 428/516 |
| 4,407,888 | 10/1983 | Crofts | 428/520 |
| 4,425,390 | 1/1984 | Changani et al. | 428/913 |
| 4,608,287 | 8/1986 | Biotteau | 428/354 |
| 4,879,148 | 11/1989 | Neaves et al. | 428/40 |

FOREIGN PATENT DOCUMENTS

| | | |
|---|---|---|
| 345408 | 9/1978 | Austria . |
| 157478 | 10/1985 | European Pat. Off. . |
| 1111223 | 4/1968 | United Kingdom . |
| 1166545 | 10/1969 | United Kingdom . |
| 1178839 | 1/1970 | United Kingdom . |
| 1411134 | 10/1975 | United Kingdom . |
| 1476386 | 6/1977 | United Kingdom . |
| 1522474 | 8/1978 | United Kingdom . |
| 2028681 | 3/1980 | United Kingdom . |
| 2061764 | 5/1981 | United Kingdom . |
| 2104800 | 3/1983 | United Kingdom . |
| 2129333 | 5/1984 | United Kingdom . |
| 2147849 | 5/1985 | United Kingdom . |
| 2159068 | 11/1985 | United Kingdom . |

OTHER PUBLICATIONS

U.S. Pat. Application Ser. No. 157,073 filed Feb. 3, 1988.

*Primary Examiner*—P. C. Sluby
*Attorney, Agent, or Firm*—Edith A. Rice; Herbert G. Burkard

[57] ABSTRACT

A particulate or filamentary coating, preferably curable, is provided on indelible labels or heat-recoverable articles, the coating comprising 4 to 90% by weight of an elastomeric binder incorporated in the coating in the form of an aqueous latex. Curable particulate materials described include epoxies and polyesters, and rubber latices include SBS, nitrile, chloroprene, EVA, and acrylates. The use of latices can enhance adhesion, ink receptivity, and humidity tolerance of the coatings.

12 Claims, No Drawings

ARTICLE SURFACE COATED WITH CURABLE PARTICULATE OR FILAMENTARY MATERIAL

This invention relates to coated articles, and in particular to articles that are provided with a coating of a particulate and/or filamentary material.

Examples of articles that are provided with curable coatings are described in British patent application No. 2,104,800A and in European patent application No. 157,478, the disclosures of which are incorporated herein by reference. Because of the friable nature of such particulate coatings it is necessary to incorporate a binder in the coating, and in the above European application water soluble polyalkylene oxides are proposed as the binder so that the coating may be applied to the article as a dispersion in an aqueous solution of the binder.

However, although the use of polyalkylene oxide binders is satisfactory in certain instances, it has limitations that prevent more widespread use. For example, it is difficult to increase the flexibility of such coatings either before curing in order to reduce their friability, or after curing in order to reduce their brittleness. It is often not practical to improve the flexibility of the coating by increasing the binder level in the coating because this can increase the viscosity of the coating dispersion to such an extent that it is not possible to form a satisfactory coating. In addition, for many applications such as in the field of electrical insulation, it is not desirable for a coating to contain large quantities of water-soluble materials.

According to the present invention, there is provided an article having a surface that is provided with a coating of a particulate or filamentary curable material, the coating including an elastomeric binder (preferably 4 to 90, more preferably 5 to 90, percent by weight of the total coating) that has been incorporated in the coating in the form of an aqueous latex.

Since the viscosity of a coating dispersion using a latex binder will usually be considerably lower than that of a dispersion containing a polyalkylene oxide binder, it is possible to increase the quantity of binder in the coating, thereby increasing the flexibility of the coating both before and after curing if it is curable, without altering the coating process employed. Alternatively, or in addition, it is possible, if desired, to increase the reactive solids content of the dispersion so as to increase the thickness of the final coating without unduly increasing the viscosity of the coating dispersion. Furthermore, because the binders that are used to form the latex will not be water-soluble, it is possible to use relatively large proportions of binder in the coating with no adverse effect on the water resistance of the coating. An additional advantage of the articles according to the invention is that, removal of the necessity that the binder be water-soluble substantially broadens the range of polymers available as binders, and facilitates the optimisation of other desirable properties of the coating such as adhesion to particular surfaces, ink receptivity and the like.

The particular quantity of binder that is appropriate will depend on a number of factors including the desired degree of flexibility, the choice of binder and the choice of particulate curable material. Preferably, however, the coating contains at least 10 percent, more preferably at least 15 percent, and especially up to 25 percent by weight, based on the total weight of the coating. Usually the coating will contain not more than 80 percent, more usually not more than 70 percent and most usually not more than 60 percent by weight binder.

Preferred binders include EPDM rubbers, styrenebutadiene-styrene rubbers, nitrile rubbers, chloroprene, neoprene, ethylene-vinyl acetate copolymers preferably containing at least 30 weight percent vinyl acetate, or an acrylate or methacrylate elastomer, e.g. an ethylene-vinyl acetate-butyl acrylate terpolymer.

As stated above, the coating is preferably in a particulate and/or filamentary form, for example it may be in the form of a mat of filaments or in the form of a mat that contains particulate material dispersed therein. Preferably, however, the coating is substantially entirely in particulate form.

Non-curing particulate or filamentary materials may be useful as additives, for example to provide coloured markings, to render the coating reflective or absorptive of radiation, or to render the coating electrically conductive. Appropriate particulate or filamentary materials for such purposes may readily be selected by known criteria.

The use of a particulate and/or filamentary coating enables coatings to be formed that are heat-curable but that also have a high degree of latency as explained in the British patent application mentioned above. That is to say, coatings may be formed that will readily cure within a relatively short length of time when heated, but can be kept for months or even years at ambient temperatures with substantially no premature curing. Such a high degree of latency may be achieved by processing the reactive components of the coating into separate particles and mixing the particles together to form the coating. Thus, the components will exist separately from each other until they are heated, whereupon they will fuse together and react. However, in other cases the reactive components may be melt blended together before comminution.

Apart from the binder, the coating may, if desired, consist solely of the reactive components although it may include one or more inert components. The inert components may be present with the reactive components in the particles, or may be mixed with the particles as a separate phase or both. For example, the coating may comprise a particulate curable resin such as an epoxy resin, preferably one based on bisphenol A or on epoxy novolak resin, as one component and a particulate curing agent having reactive amine groups or a carboxylic acid, phenolic resin isocyanate or polyester curing agent as the other. The curing agent may itself be polymeric. For example it may be a polyamide having free amino groups or a carboxylated polymer such as an acid terpolymer, in which case the particles of the curing agent need not contain any inert component. If the curing agent is not polymeric, for example an organic peroxide or other free radical initiator, it may be desirable for it to be blended with a polymeric material, e.g. a polyester or a reactive or unreactive polyamide before comminution. The curable resin may instead comprise a polyamide having free amine groups, in which case the curing agent preferably comprises a material having free or blocked isocyanate functional groups, e.g. a cresyl blocked isocyanate. Other curing systems that may be mentioned are unsaturated polyesters or polyurethanes that are cured by a blocked isocyanate curing agent, and polyesters that are cured by a polyepoxide.

Polyamides that may be used for forming one of the components are those that are conventionally used as hot-melt adhesives. These polyamides are characterized by the fact that their amide linkages are separated by an average of at least fifteen carbon atoms and have amorphous structures in contrast with the more highly crystalline, fibre forming polyamides such as nylon 6 or nylon 6.6. The polyamides preferably have an amine number of at least 5, the preferable upper limit for the amine number being determined by the fact that as the amine number increases the polyamides become liquid at lower temperatures. Such polyamides have the advantage that they may also be used to improve the flexibility of the cured coating.

Alternatively or in addition the or at least one material having reactive amine groups is one based on a polymer that is the same as or similar to that on which the epoxy resin is based. For example, and preferably, the or at least one material containing reactive amine groups is an adduct of the epoxy resin that is used with a compound containing reactive amine groups, preferably with an aliphatic diamine or triamine and especially with ethylene diamine or ethylene triamine. The use of an epoxy-amine compound adduct as the other reactive component or one of the other reactive components can significantly improve the cure rate of the adhesive in relation to its storage life, thereby permitting the storage life of the adhesive or the cured properties thereof to be improved.

Chemical curing accelerators may also be present in the coating, either blended with one of the reactive components or as separate particles. Examples of accelerators include dimethylaminopyridine, tris (dimethylaminomethyl) phenol, tin octoate, imidazole or imidazole derivatives such as salts, substituted imidazoles or metal complexes thereof.

In addition to the reactive components the coating may contain other components such as fillers e.g. hydrated metal oxides for example hydrated alumina or magnesia, reinforcing fillers e.g. silica or fillers for other purposes e.g. titanium dioxide; antioxidants, flame retardants, u/v stabilisers, fungicides and the like.

Although the binder will not usually be reactive, it is possible for it to be so, in order for example to improve the high temperature performance of the article, to improve the solvent resistance of the coating or for any other reason. The binder may react with other reactive components of the coating, for example it may comprise a hydroxylated or carboxylated elastomer that will react with an isocyanate or epoxy reactive component. Alternatively, the binder may contain a curing agent. For example a binder that is formed from an unsaturated elastomer e.g. an unsaturated polyester may include a free radical curing agent such as triallyl cyanurate or triallyl isocyanurate.

The coating dispersion may simply be formed by any of the conventional methods described in the Encyclopedia of Chemical Technology Volume 14 by Kirk Othmer published by Wiley Intersciences (1978) page 82, and by incorporating the reactive components into the latex so formed. The coating dispersion may be applied to the surface of an article by any conventional means, e.g. by knife coating, screen printing, roll coating, spray coating or by other methods. After coating the water is driven off to form the finished coating.

The coatings may be applied to a variety of articles. For example they may be applied to heat-shrinkable articles, especially heat-shrinkable moulded articles, as described in the European application mentioned above, for providing a moistureproof seal to an object such as a harness cable, or as coatings on extruded articles either in tubular or sheet form, for example on a heat-shrinkable sheet wraparound article that is used to enclose part of an elongate article whose ends are inaccessible. Alternatively they may be used to form marker assemblies for example as described in U.S. copending U.S. patent application No. 157,073 filed Feb. 3, 1988 now U.S. Pat. No. 4,879,148 which is a continuation of U.S. application No. 020,798 filed Mar. 2, 1987, in which the coating provides a porous layer of latent curable material that is capable of receiving printed indicia and which can be cured to render the indicia substantially indelible. The inclusion of a flexible binder in the marker coating can improve the ability of the marker to be printed on by impact printers e.g. thermal printers, dot-matrix printers, daisy wheel printers or golfball printers, in addition to broadening the range of printer inks that may be used. The disclosure of that U.S. application is incorporated herein by reference.

The following Examples illustrate the invention.

EXAMPLE 1

A marker assembly was formed comprising a backing layer formed from a 120 micron thick sheet of polyester sold under the trade name "Mylar", and a surface coating having the composition shown in table I.

TABLE I

| Component | Parts by Weight |
| --- | --- |
| bisphenol A epoxy resin | 100 |
| ethylene diamine-bisphenol A epoxy adduct (cure agent) | 61.4 |
| Titanium dioxide | 61.4 |
| ethylene propylene diene monomer (EPDM) | 360 |

The epoxy component and the ethylene-diamine adduct were ground to a particle size of less than 100 um. They were then each fluid energy milled to a mean particle size of 20 um with none greater than 60 um. All components except the EPDM were then mixed and blended into a 50% solids latex of the EPDM to form a dispersion. The dispersion was then coated onto the polyester sheet using a 4 inch wide doctor blade knife coater to form a 300–500 um thick layer (wet thickness). After coating the dispersion was allowed to dry at room temperature for 4–12 hours.

The assembly so formed was printed with an IBM ink jet printer. The assembly was then heated to 160° C. for 5 minutes using a convection oven in order to cure the coating.

The coating was very flexible both before and after curing. After curing the marker exhibited a matt finish. The assembly was tested for solvent resistance by immersing it in a solvent for one minute and then hand brushing it with ten strokes, this procedure being repeated two times. No deterioration of the assembly or of any print legibility was observed after immersing the marker in distilled water (70° C.), "Skydrol" aircraft hydraulic fluid (25° C.) or methyl ethyl ketone (25° C.).

EXAMPLE 2

A marker assembly was formed as described in Example 1 with the exception that the surface coating had the composition given in Table II.

TABLE II

| Component | Parts by Weight |
| --- | --- |
| bisphenol A epoxy resin | 100 |
| ethylene diamine-bisphenol A epoxy adduct (cure agent) | 30 |
| Titanium dioxide (pigment) | 54.5 |
| Antioxidant | 1.3 |
| U V Stabiliser | 5.2 |
| ethylene/vinyl acetate/butyl acrylate terpolymer | 14 |

The coating was flexible and could be printed on using a dot-matrix printer.

EXAMPLE 3

A marker was formed with a surface coating having the composition shown in table III.

TABLE III

| Component | Parts by Weight |
| --- | --- |
| polybutyl methacrylate | 90 |
| ethoxylated bisphenol A diacrylate | 7 |
| tert. butyl perbenzoate | 3 |
| titanium dioxide | 40 |
| ethylene/vinyl acetate/butyl acrylate terpolymer | 14 |

The ethoxylated bisphenol A diacrylate and the peroxide were absorbed onto the titanium dioxide and the resulting powder was mixed with the polybutyl methacrylate powder. This powder was blended into a latex of the terpolymer to form a coating dispersion. The dispersion was applied to a polyester sheet as described in Example 1 to form an ink-receptive marker.

EXAMPLE 4

A marker assembly was formed as described in Example 1 using the following coating composition:

| | Parts by Weight |
| --- | --- |
| carboxylated polyester (Crylcoat E26B UCB) | 149 |
| triglycidylisocyanurate (PT816 Ciba) | 11 |
| titanium dioxide (RTC60) | 20 |
| chlorosulphonated polyethylene latex (Hypalon HYP605 ex Revertex 55% solids) | 16 |

The coating was flexible and could be printed on using ink jet or dot matrix printers.

EXAMPLE 5

Example 4 was repeated using the following coating composition.

| | Parts by Weight |
| --- | --- |
| carboxylated polyester (Grilester P7207 ex UCB) | 80 |
| bisphenol A epoxy resin (E3003 ex shell) | 80 |
| titanium dioxide (RTC60) | 20 |
| chlorosulphonated polyethylene latex (HYP605) | 16 |

EXAMPLE 6

Example 5 was repeated using a carboxylated SBR latex (XZ86829 ex Dow) instead of the HYP605.

EXAMPLE 7

Example 4 was repeated using

| | Parts by Weight |
| --- | --- |
| hydroxylated polyester (Crilan U502 ex Bayer) | 120 |
| cycloaliphatic diisocyanate (Crilan U1 ex Bayer) | 40 |
| titanium dioxide | 20 |
| styrene/acrylic copolymer latex (SAF54 ex Wacker) | 16 |

EXAMPLE 8

Example 4 was repeated using

| | Parts by Weight |
| --- | --- |
| bisphenol A epoxy resin (DER662 ex Dow)* | 152 |
| dicyandiamide (4T2844 ex Ciba)* | 8 |
| with titanium dioxide (RTC60) | 20 |
| chlorosulphonate polyethylene (HYP605) | 16 |

*pre-blended together

In each of Examples 5 to 8, the coating was flexible and could be printed on using an ink jet printer.

For the following Examples, a coating composition was formed by blending the following particulate components (particle size <300 um) in a planetary mixer:

| | Parts by Weight |
| --- | --- |
| bisphenol A epoxy | 42.2 |
| polyamide masterbatch | 51.5 |
| ethylene/vinyl acetate/acrylic acid terpolymer | 4.2 |

The polyamide masterbatch had been prepared by melt blending a dimer diamine polyamide hot-melt adhesive with an ethylene diamine-bisphenol A epoxy adduct together with aluminium silicate, an antioxidant and carbon black.

This particulate blend was added at different levels to a series of latices to form a coatable slurry and used to coat heat recoverable articles by dip coating. These coated articles were recovered onto suitable substrates and rolling drum peel tests were conducted. The following examples give details of the latices used, levels of latex in adhesives and peel strengths to various substrates.

The following table lists the latices used.
1. Carboxylated copolymer of styrene and butadiene XZ86829 ex Dow.
2. Carboxylated copolymer of styrene and butadiene XZ86844 ex Dow.
3. Chlorosulphonated polyethylene Hypalon HYP605 ex Revertex.
4. Styrene butadiene copolymer DL 460-E ex Wacker.
5. Styrene acrylic acid ester copolymer SAF54 ex Wacker.
6. Styrene acrylic copolymer Texicryl 13-034 ex Scott Bader.
7. Acrylic Hycar 26083 ex BF Goodrich.
8. Acrylic Hycar 26120 ex BF Goodrich.
9. Polyvinylidene fluoride Kynar 32 ex Pennwalt.
10. Polyvinylidene chloride Viclan VL828 ex ICI.
11. Polyethylene Quasoft H560 ex Alkaril.
12. Acrylic LL875 ex Wacker.

Slurries prepared as above based on various latex based compositions were applied by dip coating to the inner surface of a heat recoverable polyester based tubing. After drying of the coating the tubing was heat recovered onto a similar polyester based substrate. Rolling drum peel strengths were measured at 23° C. and at 80° C. Results are shown in the following table.

| Ex | Latex | Parts Latex Solid | Parts Particulate Blend | Peel Strength N/25 nm 23° C. | 80° C. |
|---|---|---|---|---|---|
| 9 | 1 | 4 | 96 | 80.9 | — |
| 10 | | 10 | 90 | 103.5 | 30.2 |
| 11 | | 30 | 70 | 55.5 | — |
| 12 | | 50 | 50 | 58.8 | — |
| 13 | | 70 | 30 | 51.4 | — |
| 14 | | 90 | 10 | 33.9 | — |
| 15 | 2 | 10 | 90 | 87.7 | 19.4 |
| 16 | | 90 | 10 | 33.2 | — |
| 17 | 3 | 10 | 90 | 120.0 | 21.6 |
| 18 | 4 | 10 | 90 | 63.4 | 4.4 |
| 19 | | 90 | 10 | 14.0 | — |
| 20 | 5 | 10 | 90 | 93.9 | 18.8 |
| 21 | | 50 | 50 | 77.4 | — |
| 22 | 6 | 10 | 90 | 62.2 | — |
| 23 | 7 | 10 | 90 | 63.4 | — |
| 24 | 8 | 10 | 90 | 36.2 | — |
| 25 | 9 | 10 | 90 | 52.8 | — |
| 26 | 10 | 10 | 90 | 77.2 | — |
| 27 | | 50 | 50 | 40.9 | — |
| 28 | 11 | 10 | 90 | 59.6 | — |
| 29 | 12 | 10 | 90 | 51.9 | 9.2 |

Slurries were prepared as for Examples 9 to 29 and applied to the inner surface of a heat recoverable polyethylene based tubing. After drying of the coating, the tubing was recovered onto a polyester based substrate. Rolling drum peel strengths were measured at room termperature and at 80° C. Results are shown in the following table.

| Ex | Latex | Parts Latex Solid | Parts Particulate Blend | Peel Strength N/25 nm 23° C. | 80° C. |
|---|---|---|---|---|---|
| 30 | 1 | 50 | 50 | 67.4 | — |
| 31 | | 90 | 10 | 60.3 | — |
| 32 | 2 | 90 | 10 | 32.3 | — |
| 33 | 3 | 10 | 90 | 79.0 | 22.3 |
| 34 | 4 | 90 | 10 | 22.5 | — |
| 35 | 6 | 10 | 90 | 92.4 | — |
| 36 | 7 | 10 | 90 | 33.7 | — |
| 37 | 8 | 10 | 90 | 52.1 | — |
| 38 | 9 | 10 | 90 | 74.5 | — |
| 39 | 10 | 10 | 90 | 100.8 | — |
| 40 | 11 | 10 | 90 | 59.7 | — |

Latex 1 described above was used as carrier at a level of 10 parts for the particulate blend (90 parts) Details of peel strengths as measured at 23° C. are as follows:

| Ex | Substrates | Peel Strength N/25 nm |
|---|---|---|
| 41 | Polyester/polyester | 103.5 |
| 42 | Polyvinylidene fluoride/ polyvinylidene fluoride | 86.6 |
| 43 | Polyethylene/fluoroelastomer (Viton) | 39.3 |
| 44 | Polyethylene + EVA blend/ polyethylene | 49.6 |

Regarding the substrates used in these Examples 41 to 44, the polyester was that sold under the Trade Mark "DR-25"*, the polyvinylidene fluoride was that sold under the Trade Mark "Raychem Kynar"*, the polyethylene of Example 43 was that sold under the Trade Mark "—12"*, the fluoroelastomer was that sold under the Trade Mark "Viton", the blend of Example 44 was that sold under the Trade Mark "—100"*, and polyethylene of Example 44 was that sold under the Trade Mark "RNF100"*.
(* Trade Marks of Raychem Corporation).

Compositions as described for Examples 4 to 8 have been used in association with heat recoverable polyesterbased tubing. After drying of the coating the tubing was heat recovered onto a similar polyester-based substrate. Rolling drum peel strengths were measured at 23° C. Results are as follows:

| Ex | Composition | Peel Strength N/25 nm |
|---|---|---|
| 45 | ex Example 4 | 24.0 |
| 46 | ex Example 5 | 25.0 |
| 47 | ex Example 6 | 8.5 |
| 48 | ex Example 7 | 11.9 |
| 49 | ex Example 8 | 11.0 |

We claim:

1. An article having a surface that is provided with a coating of a curable particulate or filamentary material comprising at least two reactive components that exist separately from one another in the form of particles and/or filaments, the coating including an elastomeric binder that has been incorporated in the coating in the form of an aqueous latex.

2. An article as claimed in claim 1, wherein the coating includes at least 4 and not more than 90 percent by weight of the elastomeric binder, based on the total weight of the coating.

3. An article according to claim 2, wherein the coating includes at least 5% by weight of the elastomeric binder.

4. An article as claimed in claim 2, wherein the coating includes at least 10 percent by weight of the elastomeric binder.

5. An article as claimed in claim 1, wherein the binder comprises an EPDM rubber, a styrene-butadienestyrene rubber, a nitrile rubber, natural rubber, chloroprene, neoprene, an ethylene/vinyl acetate copolymer elastomer or an acrylate or methacrylate elastomer.

6. An article according to claim 1 comprising dimensionally heat-recoverable polymeric material.

7. An article as claimed in claim 1, wherein the curable material comprises an epoxy material.

8. An article as claimed in claim 1, wherein the curable material comprises a polyester.

9. An article as claimed in claim 1, wherein the curable material comprises a material having free amine groups.

10. An article as claimed in claim 1, wherein the curable material includes a free-radical curing agent.

11. An article as claimed in claim 1, wherein the binder is capable of reacting with one or more other components of the coating.

12. An article as claimed in claim 2, wherein the coating includes at least 25 percent by weight of the elastomeric binder.

* * * * *

UNITED STATES PATENT AND TRADEMARK OFFICE
CERTIFICATE OF CORRECTION

PATENT NO. : 4,980,229
DATED : December 25, 1990
INVENTOR(S) : Park, et. al.

It is certified that error appears in the above-indentified patent and that said Letters Patent is hereby corrected as shown below:

Column 4, line 8, delete "U.S."

Column 8, Claim 5, lines 2 to 3, replace "styrene-butadienesty-rene" by --styrene-butadiene-styrene--.

Signed and Sealed this

First Day of February, 1994

*Attest:*

BRUCE LEHMAN

*Attesting Officer*     *Commissioner of Patents and Trademarks*